Fig. 3.

Aug. 3, 1943.  C. G. PULLIN  2,325,632
ROTARY WING AIRCRAFT
Filed Jan. 30, 1940     11 Sheets-Sheet 9

Patented Aug. 3, 1943

2,325,632

UNITED STATES PATENT OFFICE 2,325,632

ROTARY WING AIRCRAFT

Cyril George Pullin, Genista, Newton Mearns, Scotland, assignor to Autogiro Company of America, Willow Grove, Pa., a corporation of Delaware Application January 30, 1940, Serial No. 316,330
In Great Britain January 27, 1939

12 Claims. (Cl. 244—17)

This invention relates to rotative wing aircraft comprising gyroplanes and helicopters, and more particularly to the control of such aircraft in flight.

It has been proposed in connection with propulsive airscrews for fixed wing aircraft to vary the pitch setting of the blades under the control of a centrifugal governor acting on the blades through the medium of a relay to maintain constant airscrew speed. The control of the pitch setting of the blades was devised to ensure that the blade angle should increase with increase in forward speed of the aircraft and that the blades should present minimum resistance to the air in the event of engine failure.

The control of the pitch setting of the blades of lifting rotors for gyroplanes and helicopters contemplated by the present invention takes account of conditions fundamentally different from those imposed on propulsive airscrews for fixed wing aircraft. An object of the present invention is so to control the pitch setting of a rotor blade that the blade shall be maintained in a position in which, under all conditions, the angle of attack will approach the optimum, resulting in high efficiency of the rotor.

A further object of this invention is to provide a rotor hub and control means in which provision is made for varying the pitch setting of the rotor blades in accordance with the above object and also providing for cyclic variation of the blade pitch angle to obtain shifting of the lift line of the rotor.

In the application of this invention to a rotor for rotative wing aircraft, provision is made for maintaining during normal flight a substantially constant speed of the rotor irrespective of its passage through the air.

A rotor (or rotors) for a helicopter is (or are) subject to variation of flow through the disc as between vertical ascent and subsequent translation in forward flight. This variation of flow would normally bring about an increase or decrease in the speed of the rotor but with the system contemplated by this invention the speed of the rotor is maintained substantially constant by altering the pitch angle of the blades.

I propose to effect the desired change of pitch angle of the blades under the control of a relay which in turn is controlled by a centrifugal governor coupled to one or more rotors and so arranged that in the event of a slight reduction in the speed of the rotor the centrifugal governor brings into action the relay to reduce the pitch angle of the rotor blades and vice versa so that the speed of the rotor remains substantially constant in flight. It has been found that the use of an intermediate relay is desirable to prevent the transmission of blade oscillations to the centrifugal governor resulting in instability.

When this invention is applied to helicopters the mechanism can advantageously be used to return the blades to gyroplane (i. e. autorotational) pitch angle in the event of a failure of the engine or of the transmission between the engine and the rotor so that the aircraft may be landed as a gyroplane. The apparatus may also be used to maintain the rotor blades in a zero lift position or thereabouts to permit "jump-start" operation and may also be provided with a pilot's override control to allow the blade pitch angle and/or the rotor speed to be altered.

One constructional embodiment of a rotor hub and control means in accordance with this invention are illustrated by way of example in the accompanying drawings, in which.

Referring to the drawings: A helicopter has a pair of side-by-side rotors 100, 200 of similar construction which rotate in opposite directions. These are shown diagrammatically in Fig. 1 which shows them driven through shafts 101, 201 and bevel drives 102, 202 respectively. Below the rotor 100 is mounted a chain wheel 103 which is driven by a control wire 104 passing over a pulley 105 from a wheel 106 of the pitch change control hereinafter described. Below the chain wheel 103 is mounted a smaller chain wheel 107 which is coupled by a control wire 108 passing over a pulley 109 to a pilot's control for effecting cyclic pitch change of the rotor. Similar arrangements are provided for the rotor 200, the parts corresponding to the parts 103 to 109 having reference numbers 203 to 209.

Figures 1, 2:
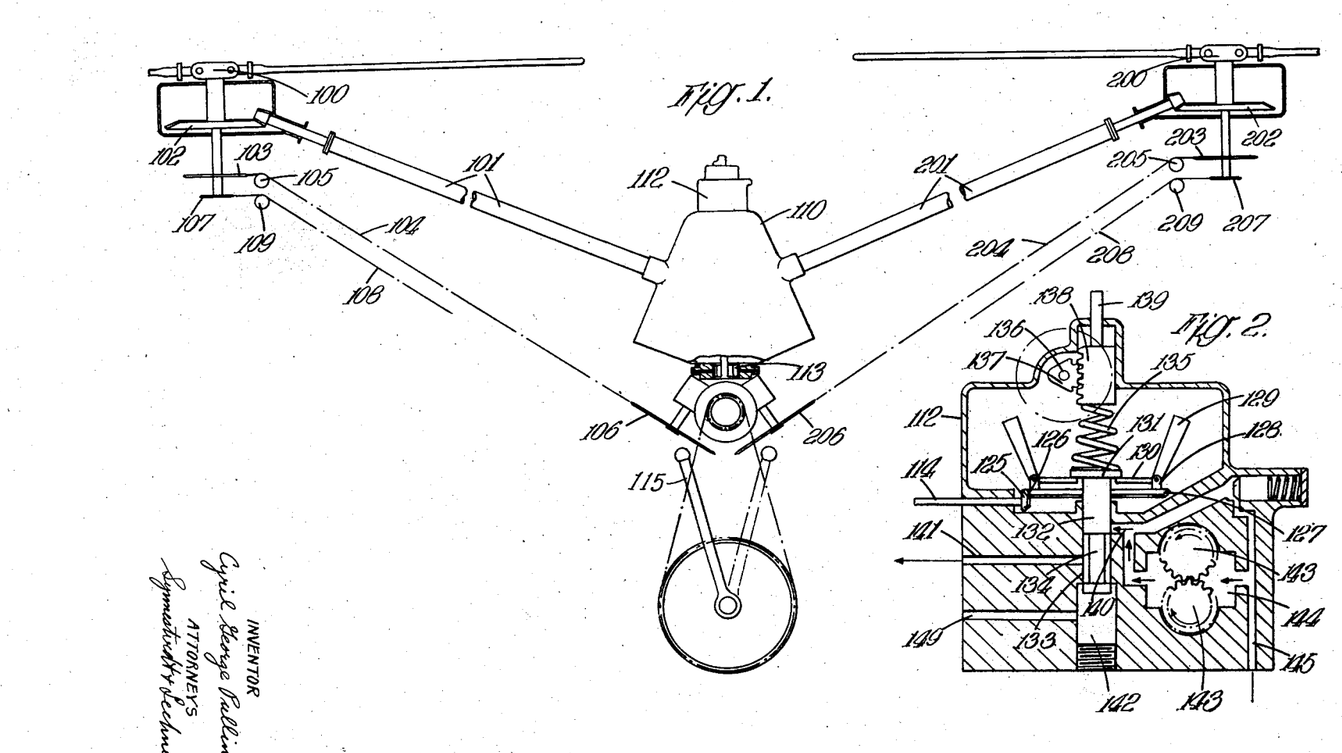
Fig. 1 is a diagrammatical view in a fore and aft direction of a helicopter having a pair of side-by-side sustaining rotors.
Fig. 2 is a diagrammatical view of a centrifugal governor for use with the above.

The rotor drive shafts 101, 201 are driven from a gearbox 110 on the centre line of the aircraft. A shaft extending upwardly from the gearbox 110 drives a centrifugal governor 112, hereinafter described with reference to Fig. 2. An oil pump 113 which provides oil under pressure for the lubrication of the various control organs and for the centrifugal governor is mounted below and is driven from the gearbox 110. This pump may be of the gear type and be provided with relief valves to keep the output pressure sensibly constant.

Fig. 2 shows diagrammatically the centrifugal governor unit 112. The drive shaft 114 from the gearbox 110 has at its end a bevel pinion 125 which drives a bevel wheel 126 on a disc 127 mounted on a vertical axis. Pivotally secured to brackets 128 on the disc 127 are a pair of weights 129 having arms 130 extending radially inwards. The innermost ends of the arms 130 lie below a collar 131 on the upper end of the plunger 132 of a piston valve. The plunger slides in a vertical bore 133 and has intermediate its ends a part 134 of reduced size so that an annular space is left between the plunger 132 and the bore 133. The plunger 132 is pressed downwardly by a coil spring 135, the initial pressure of which is adjustable by turning a shaft 136 having a toothed sector 137 which engages a rack member 138 to which the upper end of the spring 135 is secured. A pilot's override control is connected to the shaft 136. The rack member 138 is vertically slidable in guides in the governor housing and is provided with an extension 139 which passes through the upper end of the casing.

When the rotor is turning at normal speed the plunger 132 of the piston valve is held in the position shown, by the upward pressure of the arms 130 due to the tendency of the weights 129 to fly outwards balancing the downward pressure of the spring 135. By varying the initial setting of the spring by the pilot's override control connected to the shaft 136 the rotor speed at which this equilibrium speed is attained can be adjusted.

Mounted in the housing of the centrifugal governor 112 is a gear type oil pump comprising two meshing pinions 143 which turn in the directions indicated thereon. Oil from the pump 113 passes to an inlet chamber 144, through a passage 145 and after passing through the pump and through an outlet chamber 146 reaches a delivery port 140. When the oil is not able to pass through the port 140 it is by-passed through a plunger valve 147 controlled by a spring 148 to the pump inlet chamber 144. The pump pinions 143 are driven from the shaft 114 by means not shown.

When the rotor speed increases above the adjusted equilibrium speed the plunger 132 rises, allowing oil under pressure to pass from the port 140, which is connected to the oil pump 143, to the annular space around the part 134 of the plunger and from thence to a passage 141 to the pitch change control, which will hereinafter be described. This increases the pitch angles of the blades of both rotors so that their rotational speed is reduced owing to the increased power which they absorb.

When the rotor speeds return to normal the plunger 132 moves downward cutting off the supply of oil from the port 140. Should the rotor speeds drop below the adjusted equilibrium speed of the governor the plunger 132 moves downward and puts the passage 141 into communication with a lower chamber 142 having a passage 149 connecting it to the oil sump. This allows the oil pressure in the pitch change control to be reduced thereby reducing the pitch angles of the rotor blades and allowing their rotational speed to return to normal.

Figure 3:
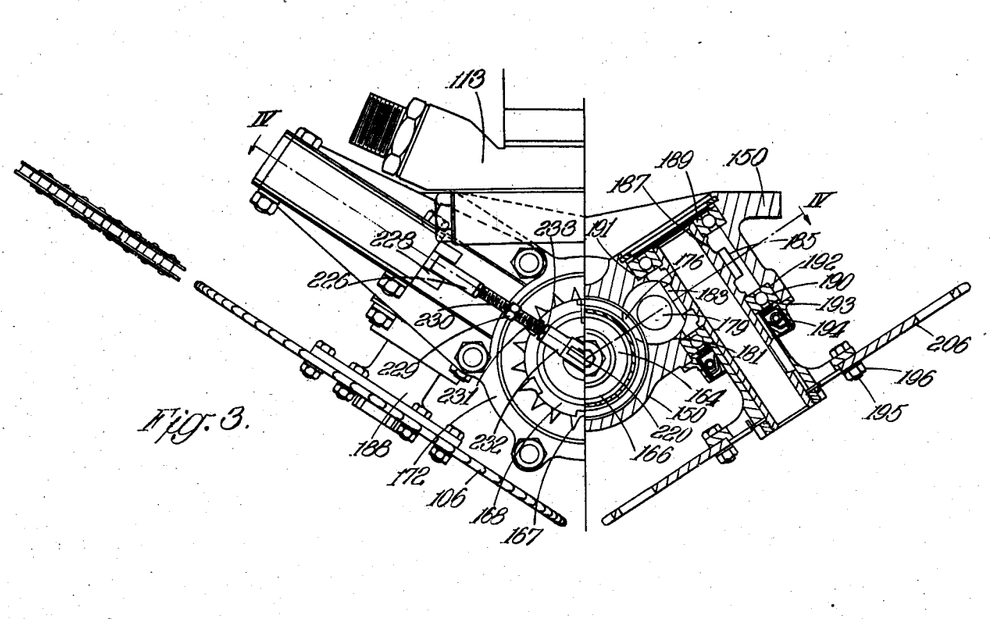
Fig. 3 is an elevational view partly in section of the rotor pitch change control.
Figure 4:
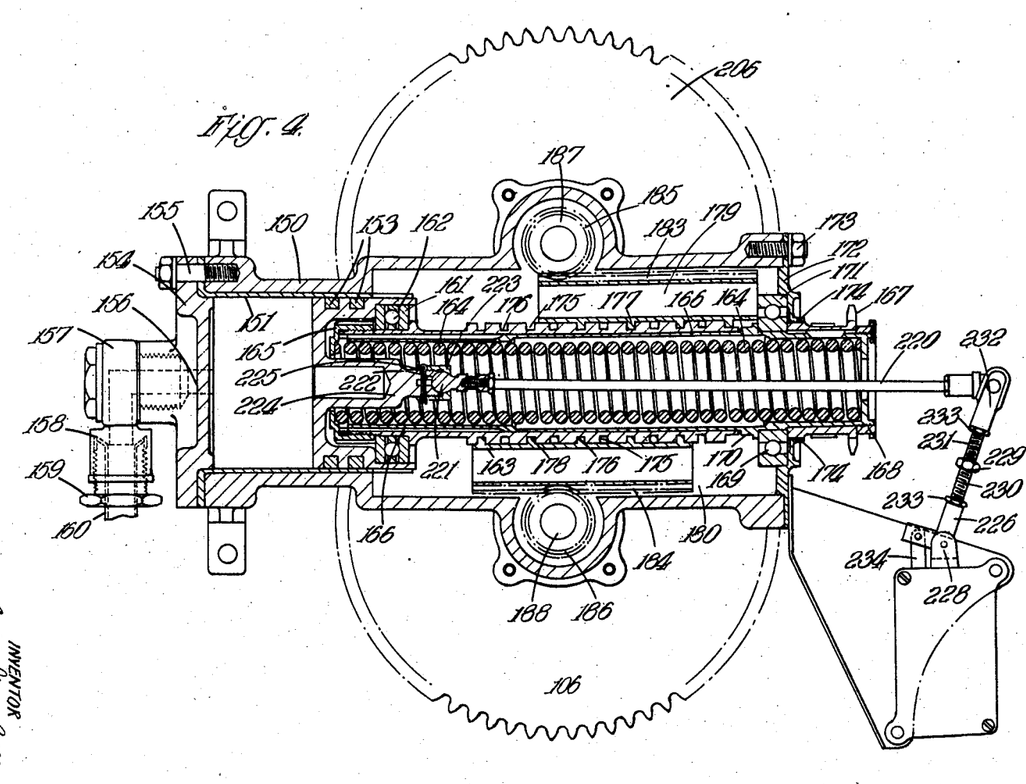
Fig. 4 is a sectional view on the line IV—IV of Fig. 3.

The rotor pitch control unit is illustrated in Figs. 3 and 4. It comprises a housing 150 having at one end a cylinder 151 in which a piston 152 with piston rings 153 is slidable. The cylinder head 154 secured to the housing 150 by studs and nuts 155 has a central passage 156 which communicates through a union 157 and a screwed pipe joint 158, 159 with a pipe 160 (Fig. 4) which is connected to the passage 141 of the governor unit (see Fig. 2).

The piston 152 is connected by a thrust ball bearing 161 housed in a recess 162 in the piston to a sleeve 163. The sleeve 163 is urged by a coil spring 164 into the cylinder 152, the left hand end (as seen in Fig. 4) of the spring 164 abutting against an annulus 165 screwed onto the left hand end of the sleeve 163. Axially slidable within the sleeve 163 and splined thereto is a liner 166 which surrounds the spring 164 and carries at its right hand end a sprocket 167 clamped to the liner 166 by a screwed ring 168 which also secures a ball journal bearing 169 against a collar 170 on the liner. The outer member of the ball bearing 169 is held in a recess 171 in a cover plate 172 clamped to the housing 150 by studs and nuts 173. The aperture in the cover plate 172 through which passes the lever 166 is a close fit over the liner and is provided with a dirt excluding packing 174.

Formed on the exterior of the sleeve 163 are coarse pitch left and right hand screw threads 175 and 176 which are similar to each other except in hand. These threads 175 and 176 are engaged respectively by projecting parts 177 and 178 on rack members 179 and 180 which are of generally cylindrical shape and slide in guides 181 and 182 in the housing 150 and have rack surfaces 183 and 184 which engage pinions 185 and 186 on shafts 187 and 188 respectively. The shaft 187 is mounted in journal ball bearings 189 and 190 housed in recesses 191 and 192 in the housing 150 and is held in position by a ring 193 and oil retaining packing 194. A flange 195 on the shaft 187 has a chain wheel 206 secured to it by bolts 196. The mounting of the shaft 188 is similar to that of the shaft 187 and it carries a chain wheel 106.

A rod 220 is attached to a projection 224 formed on the piston 152 by a ball joint comprising a ball 221 on the rod, a seating 222 and a screwed cap 223. The cap 223 is maintained against rotation by a split pin 225. The other end of the rod 220 is pivotally secured to the longer arm of a bell crank 226 pivoted at 227 to a bracket 228 mounted on the housing 150. The length of said longer arm of the bell crank 226 is adjustable by turning a central part 229, having left and right-hand threads 230 and 231, relatively to the ends 226 and 232 of said arm. Screwed nuts 233 are provided for locking this central part 229 in the desired adjustment position. The shorter arm of the bell crank 226 is connected by a Bowden wire or analogous transmission to a rotor pitch indicator in the pilot's cockpit.

When oil pressure is applied by the governor unit 112 through the passage 141 (Fig. 2) and thence through the pipe 160 (Fig. 4) to the cylinder 151 it causes the piston 152 to move to the right against the action of the spring 164. As it moves, the piston carries with it the sleeve 163 which slides over the liner 166. The sleeve 163 being secured to the rack members 179 and 180 by the projections 177 and 178 carries these rack members with it, causing rotation of the pinions 185, 186 in opposite directions, thereby rotating the chain wheel 206 counter-clockwise and the chain wheel 106 clockwise. These chain wheels are coupled to the rotor hubs to give equal increase of the pitch of each rotor. When the oil pressure is reduced as a result of a drop in speed of the rotor causing a downward movement of the plunger 132, the piston 152 urged by the spring 164 moves back towards the left and causes equal reduction of pitch of the rotors.

Should the engine fail, the speed of the transmission shafts, governor and rotors will drop causing operation of the governor 112 and the plunger valve 132 to reduce the oil pressure in the cylinder 151 allowing the piston 152 to move under the action of the spring 164 to its extreme left hand position as viewed in Fig. 4. The coupling between the pitch control unit and the rotor pitch change chain wheel 103 is arranged so that with the piston 152 in this position the rotor blades are disposed at gyroplane incidence, thereby allowing the aircraft to be landed as a gyroplane.

The pilot's override control connected to the shaft 136 may be used to effect equal pitch change of the rotors by causing the governor unit 112 to operate by changing the equilibrium speed to which it is adjusted.

Rotation of the sprocket 167 causes turning of the liner 166 and the sleeve 163 splined thereto relatively to the housing 150 and piston 152. This turning brings into play the opposite handed threads 175 and 176 and hence movement of the rack members 179 and 180 in opposite directions giving equal and opposite or differential pitch change of the two rotors. This differential pitch change of the rotors is arranged to provide lateral control of the aircraft.

The construction of a rotor hub is illustrated in Figs. 5 to 8 and Figs. 9 and 10. Each rotor blade 250 is secured at its root end to a root member 251 supported by journal ball bearings 252 and 253 and a ball thrust bearing 254 in a hollow sleeve split into two parts 255 and 256 secured together by bolts and nuts 257. Each of the parts 255, 256 forming the sleeve has a lug 258 with an aperture 259 forming a housing for the roller bearing 260 of a flapping articulation (see Fig. 8). Each of the bearings 260 is held in position by a ring 261 with a locking screw 262. The pin members 263 of the flapping articulation are two opposite branches of a spider 264 having four branches in one plane mutually at right angles to each other. The branches 265 form the inner members of a vertical drag articulation the axis of which intersects the flapping articulation at right angles. Plugs 266 are screwed into the ends of the pin members 263 which are hollow.

Figure 5:
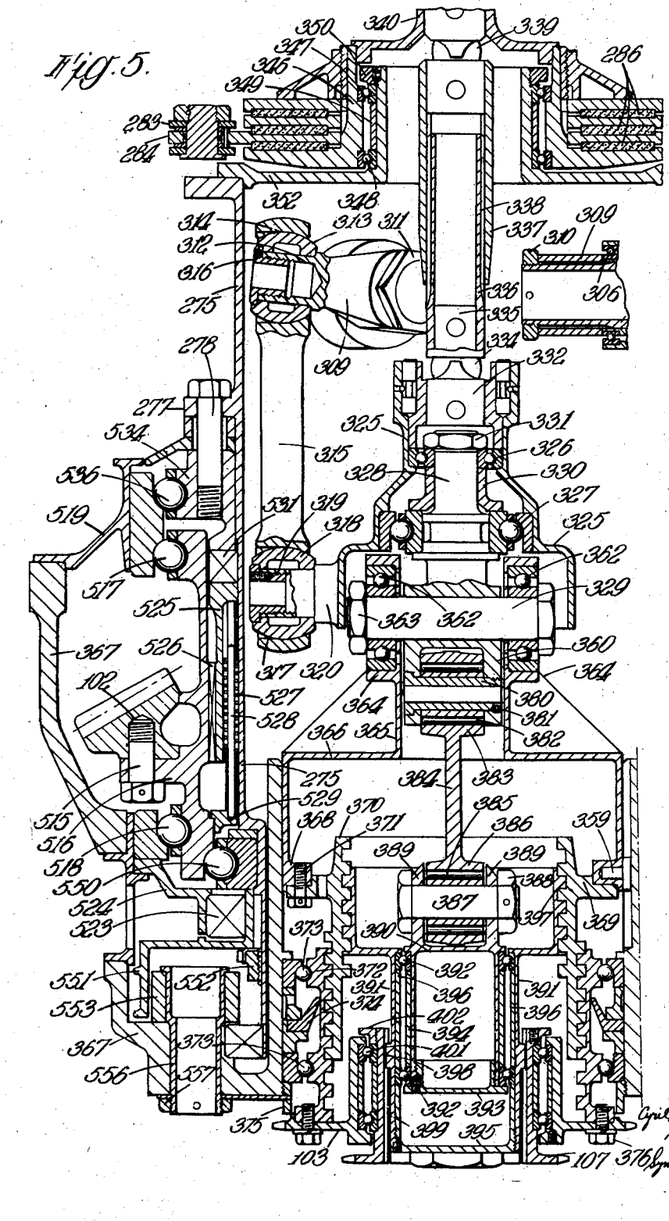
Fig. 5 is a vertical lateral cross section through the hub of one of the rotors.
Figure 5A:
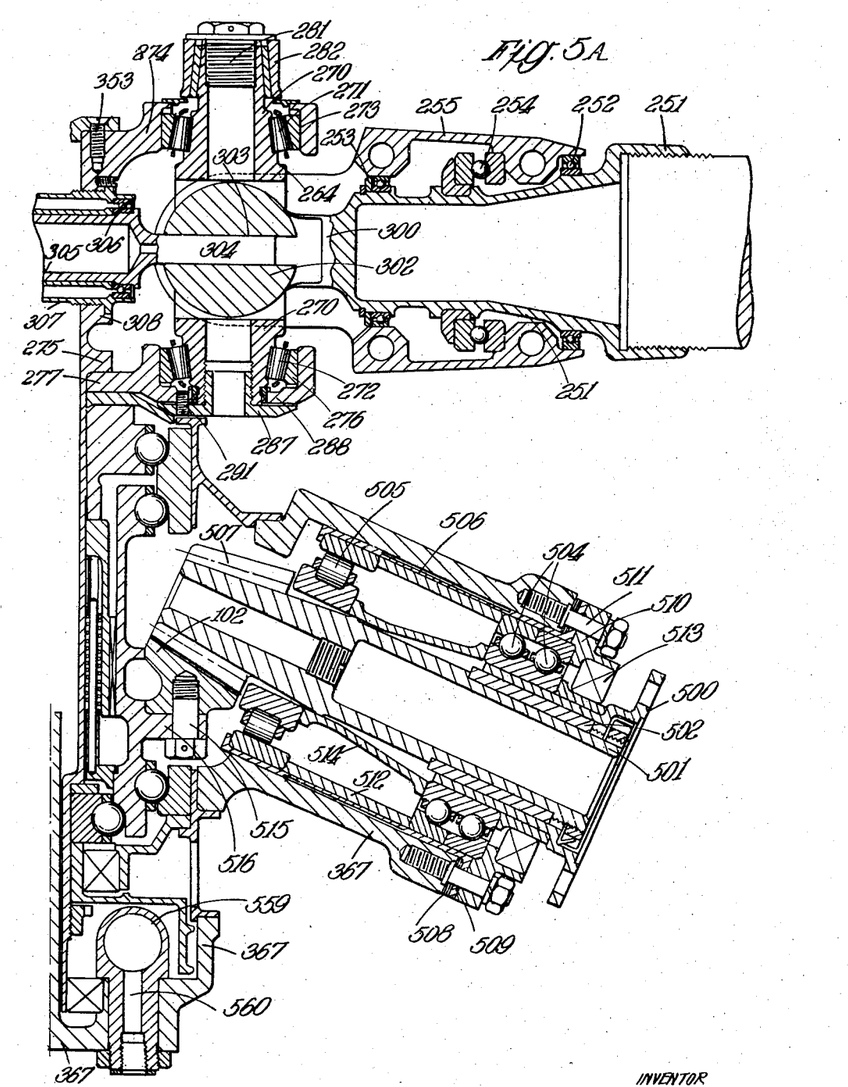
Fig. 5a is a continuation of Fig. 5 on the right-hand side of Fig. 5.
Figure 6:
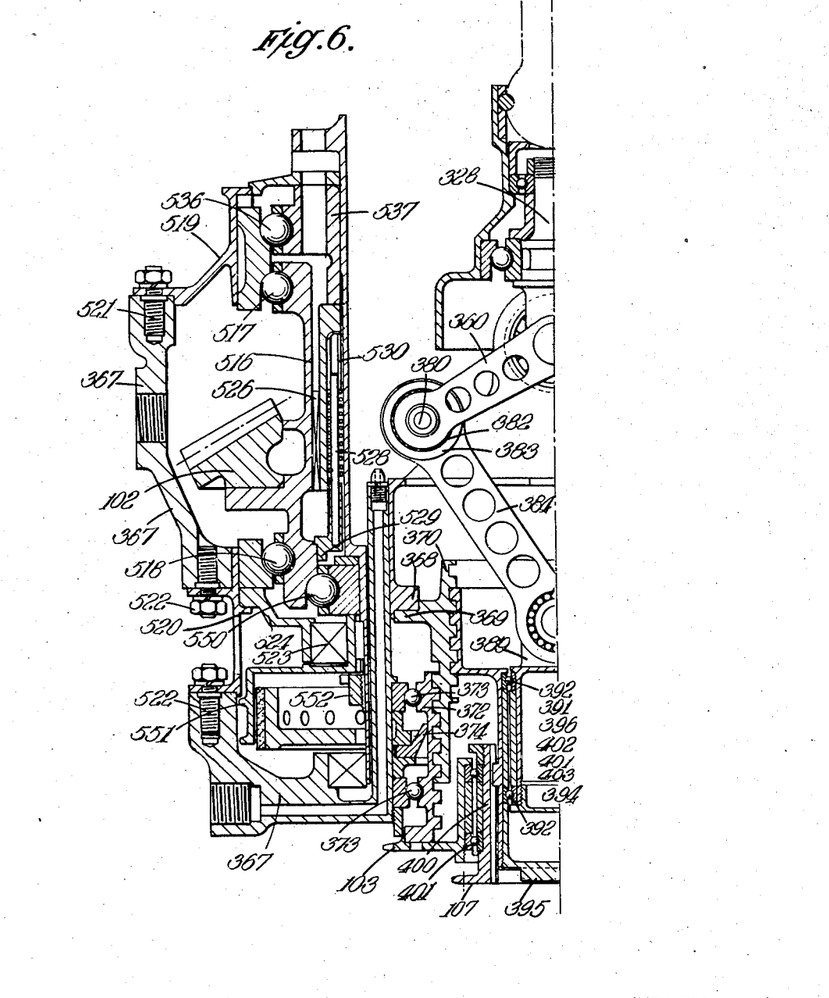
Figs. 6 and 6a, taken together, comprise a lateral sectional view at right-angles to Fig. 5 showing the lower part of the hub.
Figure 6A:
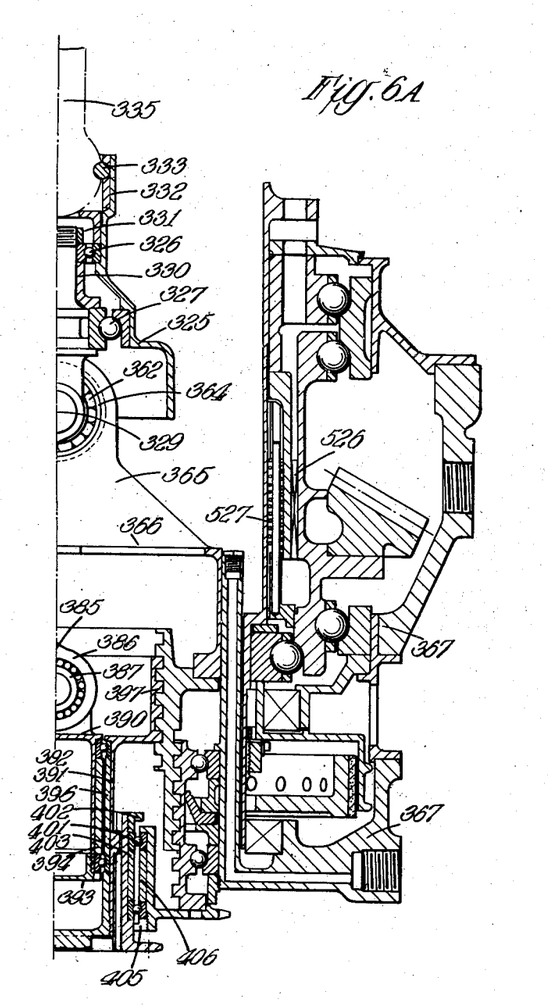

The drag articulation is best seen in Fig. 5A. The spider 264 has a pair of vertical pin members 270 which form the inner parts of combined journal and thrust conical roller bearings 271 and 272. The outer part of the upper bearing 271 is held in a recess 273 in a lug 274 extending from the rotating shell 275 of the hub, while the outer part of the lower bearing 272 is similarly held in a housing 276 in a member 277 surrounding the shell 275 and secured thereto by bolts 278 which pass through holes in lugs 279 and 280 on the shell 275 and member 277 respectively.

Figure 7:
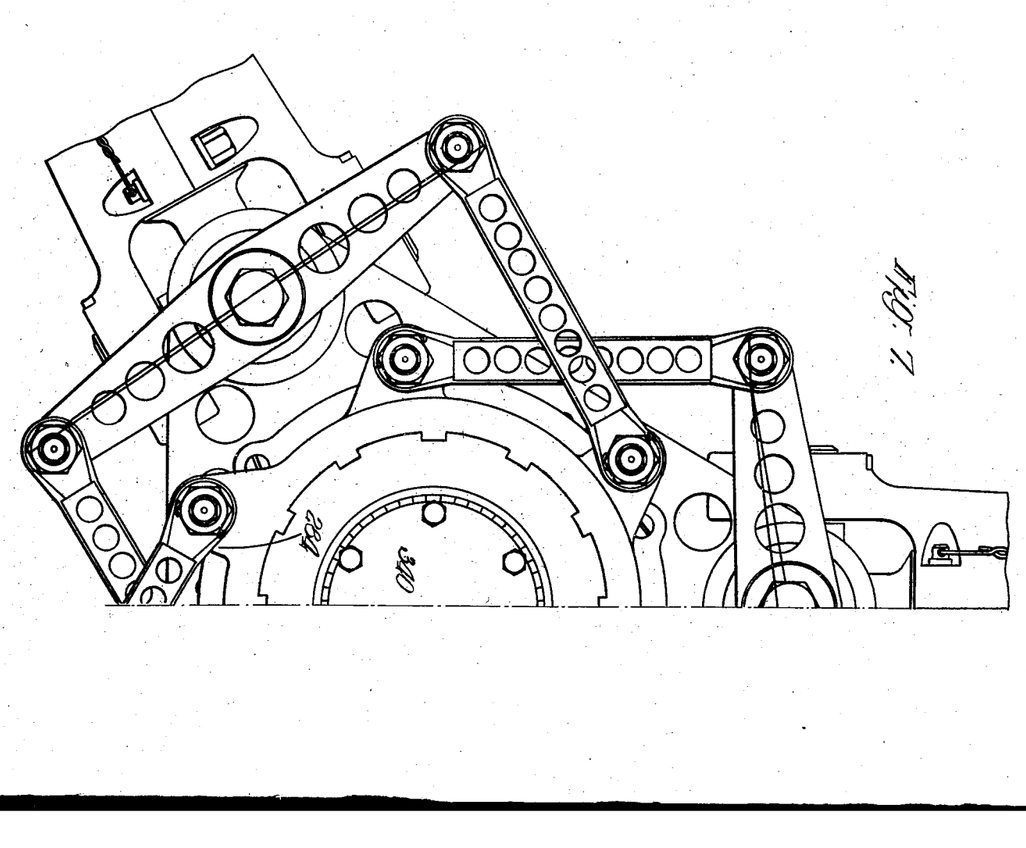
Figs. 7 and 7a taken together, comprise a plan view of the rotor hub.
Figure 7A:
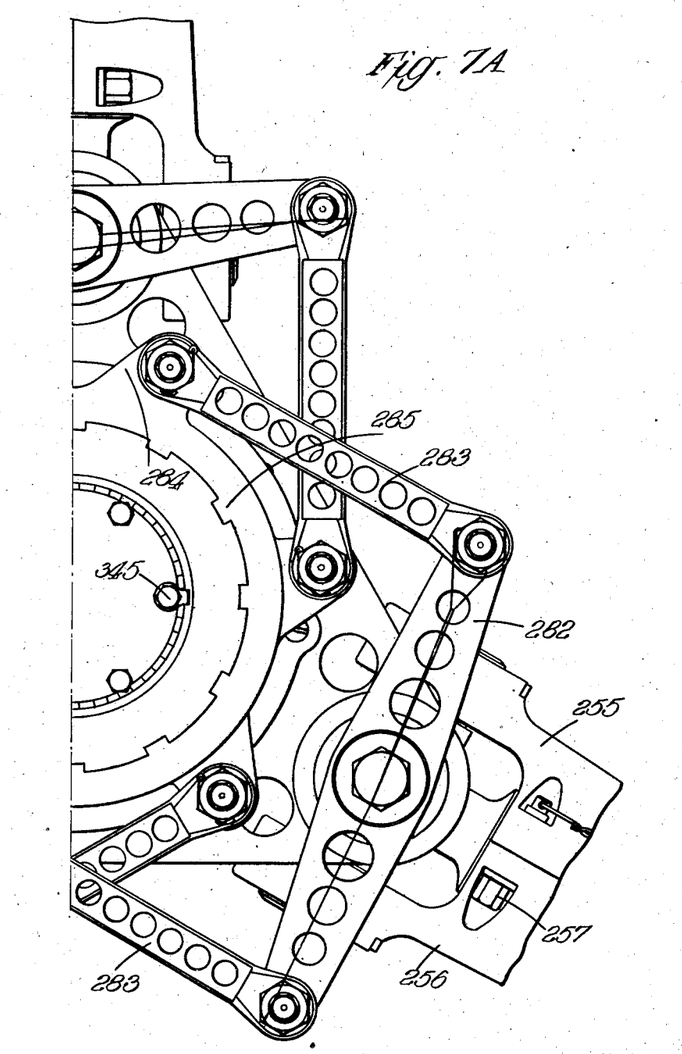
Figure 8:
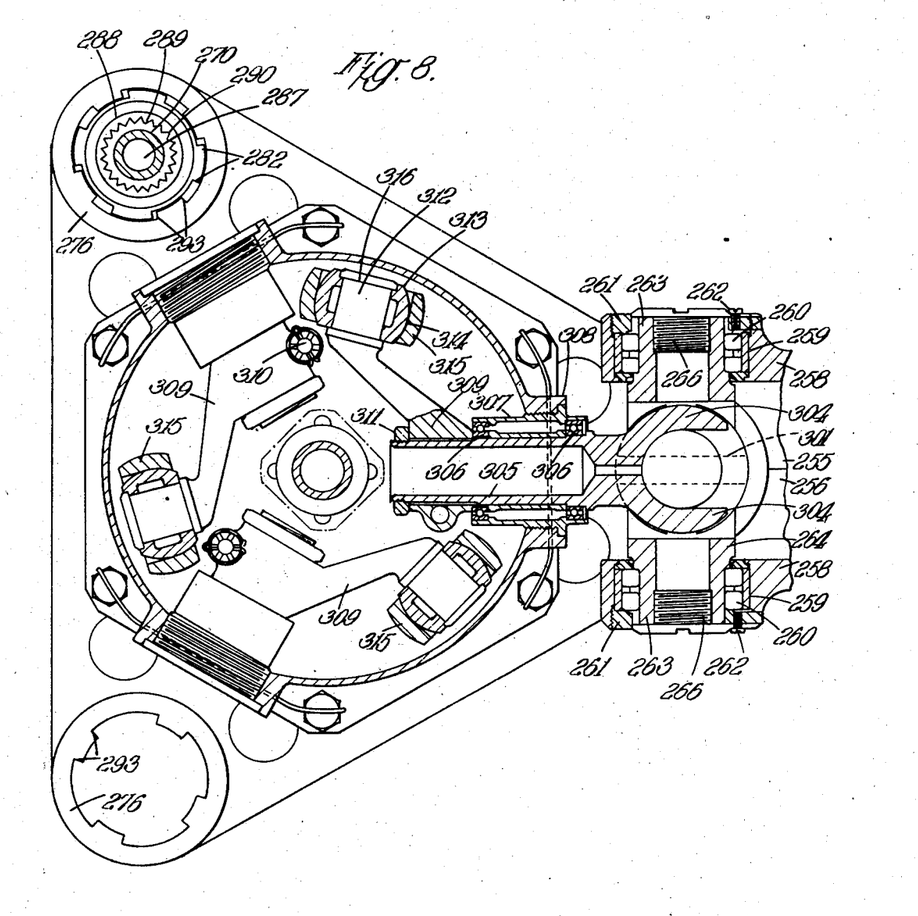
Fig. 8 is a fragmentary horizontal sectional view through the rotor generally in the plane of the blades.

A screwed plug 281 at the upper end of the upper pin member 270 rigidly secures thereto a plate 282 at each end of which links 283 are pivotally secured (see Fig. 7). The other ends of these links 283 are pivotally secured to lugs 284 on plates 285 one for each blade arranged in pile form concentrically above the hub (see Fig. 5). Between adjacent plates 285 are arranged rings of friction material 286. The whole assembly forms a friction damper for movements about the drag articulations and is rotatable as a unit relatively to the shell 275 of the hub, together with a cover plate 340 of the hub.

A screwed plug 287 at the lower end of the lower pin member 270 holds in position a plate 288 which has a central aperture with a series of inwardly directed serrations 289. These serrations engage corresponding outwardly directed teeth 290 on the pin member 270 and allow the plate 288 and pin member 270 to be secured together in various rotational positions. The plug 287 is secured to the plate 288 by a set screw 291. The plate 288 has on its periphery stops 292 which cooperate with stops 293 on the housing 276 to limit movement of the blade about the drag articulation (see Fig. 8). By removing the plate 288 and re-engaging it in a different rotational position on the pin member 270 these limits can be altered.

The root member 251 of the blade has an inwardly directed extension 300 which terminates with a pair of arms which engage a circumferential groove 301 in a ball 302 the centre of which lies at the intersection of the flapping and drag axes. A similar groove 303 at right angles to the groove 301 is engaged by the forked arms 304 at one end of a shaft 305 which is supported in journal ball bearings 306 carried by a sleeve 307 which passes through the shell 275 and is screwed into a lug 308 thereon. Keyed to the inner end of the shaft 305 is a pitch change arm 309 which is secured in position by a bolt and nut 310 which clamp the split end of the arm 309 onto the shaft 305 and by a nut 311 on the shaft 305.

At its free end the pitch change arm 309 has a pin 312 which extends generally radially outwards and carries a spherical seating member 313 held in position by a bolt 316 and cooperating with an internal partly spherical surface 314 in an aperture at the upper end of a dependent pitch change link 315. When the hub is rotating the action of centrifugal force maintains the internal surface 314 in contact with the seating member 313 but when still, the dismantling of the mechanism is facilitated. At its lower end the pitch change link 315 has a similar surface 317 cooperating with a spherical seating member 318 held in position by a bolt 319 on a radial pin 320 carried by a swash plate 325.

The swash plate 325 is carried by bearings 326 and 327 on a spindle 328 which is tiltable in a vertical fore-and-aft plane about the axis of a pivot 329. The lower bearing 327 acts as a thrust and journal bearing while the upper, 326, separated from the former by a distance piece 330, is a journal bearing only and is secured by a nut 331 on the spindle 328. Secured by bolts 332 to the upper end of the swash plate 325 is a lower element 333 of an universal joint 334 the other element 335 of which is secured to one part 336 of a link, 336, 337 comprising two telescoping parts having splines 338 between them. The part 337 of the link is attached by an universal joint 339 to a flange of a cover plate 340 of the hub.

The cover plate 340 is bolted at 345 to an annular member 346 which supports the friction damper hereinbefore described and which is carried by journal bearings 347, 348 spaced by a distance piece 349 and secured by a nut 350 on an upwardly extending flange 351 of a bridge plate 352 secured to the upper end of the shell 275 of the hub by bolts 353.

It will be seen that the above-described connection between the swash plate 325 and the cover plate 340 ensures that they turn simultaneously while permitting vertical movement between them. Thus when the annular member 346 carrying the friction damper for lead-lag movements of the blades moves relatively to the shell 275 it turns the swash plate and prevents any pitch change due to such movement.

The spindle 328 has formed integrally with it a bell crank having two parallel arms 360 spaced apart and also a transverse bush 361 through which passes the pivot 329 carrying at each end a journal ball bearing 362 secured in position by a nut 363. The outer parts of the bearings 362 are supported by bushes 364 in flanges 365 extending upwardly from a crosshead 366 which is vertically slidable relatively to a fixed part 367 of the hub and is maintained against rotation by a keyway 359. The crosshead 366 has an internal flange 368 to which a flange 369 of a member 370 having coarse pitch internal and external screw threads, is secured by bolts 371.

The external thread on the member 370 is engaged by an internally screw threaded ring 372 supported by thrust bearings 373, which prevent vertical movement, in the fixed part 367 of the hub. The thrust bearings 373 have between them an oil retaining packing ring 374 and are held in position by a clamping ring 375. Bolted at 376 to the lower end of the ring 372 is a chain wheel 103 by which, as previously mentioned, the pitch of the rotor is controllable.

When the chain wheel 103 is turned it turns the ring 372, the screw thread on which causes the member 370 and crosshead 366 to move vertically carrying with it the pivot 329, spindle 328 and swash plate 325. Since the lower ends of the pitch change links 315 are secured to the swash plate 325 they transmit the vertical movement to the pitch change arms 309 secured to the blades thereby causing the shafts 305, ball 302 and blade root 251 to turn, altering the pitch.

Between the open ends of the arms 360 of the bell crank integral with the spindle 328 is a bolt 380 locked in position by a set screw 381. Carried by the bolt 380 is the inner element of a needle roller bearing 382 the housing of which is formed by an apertured lug 383 of a connecting link 384. A second needle roller bearing 385 is similarly mounted in an apertured lug 386 at the other end of the connecting link 384. The inner element of the bearing 385 is carried on a bolt 387 secured by a nut 388 and extending between flanges 389 at the upper end of a central member 390. The latter is secured to a sleeve 391 by combined journal and thrust bearings 392 which allow relative rotation but no axial movement between the central member 390 and sleeve 391. The bearings 392 are secured to the central member by a ring 393 and distance piece 394 and are similarly secured by a ring 395 and distance piece 396 to the sleeve 391.

The sleeve 391 has a flanged part 397 with an external screw thread cooperating with the internal screw thread on the member 370. On the exterior of the generally cylindrical part of the sleeve 391 are formed projections 398 which engage keyways 399 in the elongated bush 400 of a chain wheel 107. These keyways 399 permit the sleeve 391 to move vertically relatively to the hub but transmit to it rotational movements of the chain wheel 107. The bush 400 is supported by combined journal and thrust bearings 401 which are secured on the bush by a ring 402 and distance piece 403 and on the bush 404 of the chain wheel 103 by a ring 405 and distance piece 406.

When the chain wheel 107 is rotated it turns the sleeve 391 which moves vertically under the action of the screw threads on its flanged part 397 carrying with it the central member 390 and the lower end of the arms 360 of the bell crank which tilts the spindle 328 integral therewith. This tilts the swash plate 325 so that as it rotates with the rotor the lower ends of the pitch change links 315 move vertically up and down causing cyclic pitch change.

The control wires 108, 208 are coupled to the control column 115 so that when the column is moved forwards or backwards the pitch of the blades in each of the rotors is altered cyclically by equal amounts in the same sense thereby providing fore and aft control of the aircraft. These wires are also coupled to the "rudder bar" or equivalent control in such a way that when the latter is operated, differential cyclic pitch change of the rotors occurs, i. e. the pitch angles of the blades are altered cyclically in each of the rotors but the phasing and/or amplitude of the cyclic pitch change is unequal in the two rotors thereby providing a control in yaw for the aircraft. Such cyclic control, including the hook-up to the control stick, is disclosed more fully in my co-pending application 331,318, filed April 24, 1940.

The rotors are driven from the common gearbox 110 by shafts 101 and 201. The end of the shaft 101 nearest the rotor 100 has a flange not shown which is bolted to a flange 500 secured on a shaft 501 by keys 502 and a ring 503 screwed onto the shaft (see Fig. 5A). The shaft 501 is carried in ball bearings 504 and a roller bearing 505 within a sleeve 506 slidable within a cylindrical projection from the main non-rotating part 367 of the hub. This sleeve provides means for locating the shaft in correct axial position so that a pinion 507 on the shaft 501 meshes properly with the crown wheel ring 102 of the rotor. This axial adjustment is provided by shims 508 interposed between a flange 509 on the sleeve 506 and a ring 510 clamped by studs and nuts 511 to the hub part 367. The ring 510 clamps the bearings 504, 505 and a distance piece 512 within the sleeve 506 and also provides a housing for an oil-retaining packing 513. On the shaft 501 the bearings and a distance piece 514 are secured by the clamping action of the ring 503.

The crown wheel 102 is bolted at 515 to an annulus 516 supported within the non-rotating part 367 of the hub by combined journal and thrust bearings 517, 518 supported by parts 519 and 520 respectively which latter are secured by studs and nuts 521 and 522 to the hub part 367. An oil-retaining packing 523 is held by a ring 524 carried by the part 520.

Figure 9:
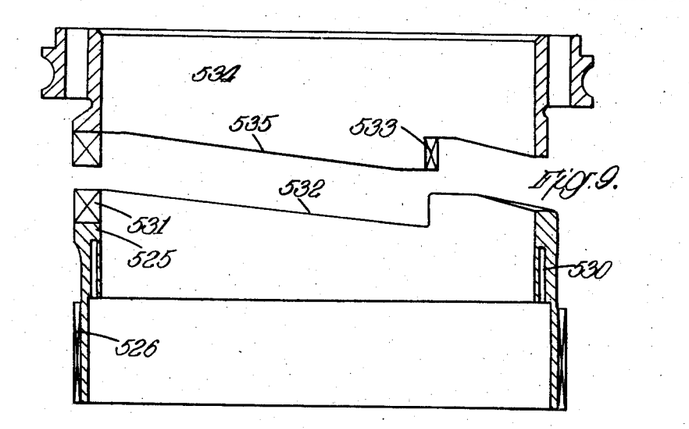
Fig. 9 is a sectional view showing details of the rotor drive clutch.
Figure 10:
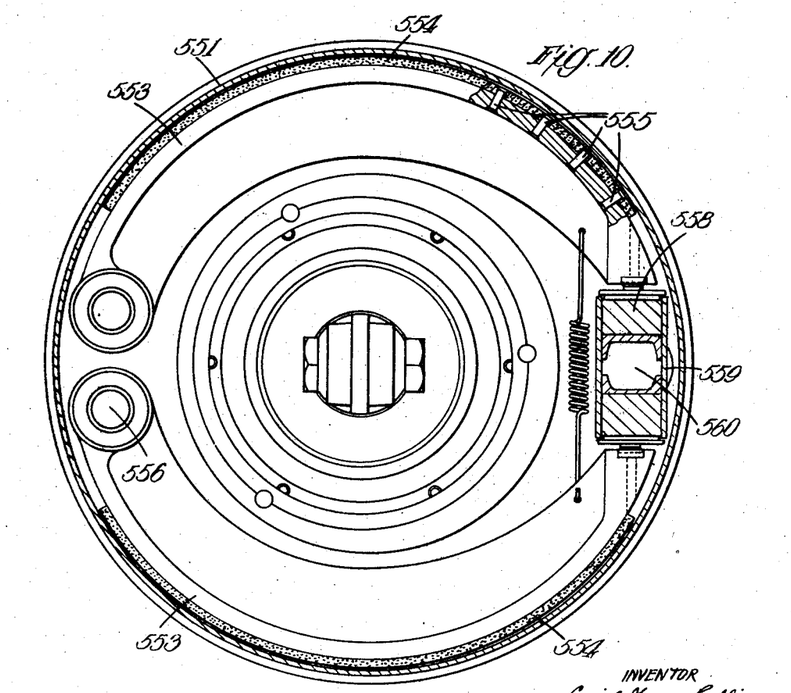
Fig. 10 is a view partly in section showing details of the rotor brake.

An axially slidable member 525 is attached by splines 526 to the inner surface of the annulus 516 and is urged upwardly by springs 527 surrounding rods 528 carried by a lower spacer 529 and by holes 530 in the member 525. The upper end of the member 525 has a series of dog clutch surfaces 531 spaced at 120° (the same angle as that between the rotor blades) and backed off by inclined surfaces 532. These clutch surfaces 531 are adapted to engage corresponding surfaces 533 projecting downwardly from an upper clutch member 534, which also has inclined surfaces 535 corresponding to the inclined surfaces 532. The upper clutch member 534 is secured by the bolts 278 to the shell 275 and is supported near its upper end by a journal and thrust bearing 536 supported by the part 519 on the stationary part of the hub. While the rotor is being driven the surfaces 531 and 533 engage but when the rotor is overrunning the drive, the member 525 is pressed downwardly against the action of the springs 527 by the inclined surfaces 532 and 535.

It will be noted that while the rotor is overrunning the drive there is no positive relationship between the speeds of the rotor and governor. Should the speed of the drive drop below the adjusted equilibrium speed of the governor, the rotor pitch will be reduced to gyroplane incidence by the control unit.

The lower end of the shell 275 is supported by a thrust and journal bearing 550 between said shell and the annulus 516. Secured to the lower end of the shell 275 is a rotor brake drum 551 held in position by a ring 552. The brake (see especially Fig. 10) has two shoes 553 with surfaces of friction material 554 attached by rivets 555. One end of each of the shoes 553 is pivotally connected at 556 to the stationary hub part 367, the pivot pin 556 being secured by a screw nut 557. The other ends of the brake shoes are in contact with control plungers 558 which move in a common cylinder 559 into the central part of which oil under pressure is introduced through a passage 560 when it is desired to stop the rotor. A spring 561 holds the shoes 553 in contact with the plungers 558.

In operation, assuming the governor to be set for, say, a rotor speed of 200 R. P. M., with the engine running the clutch is engaged and the rotor (or rotors) speeded up while the blades are held in a reduced pitch position (piston 152 at left hand end of the cylinder 151 (Fig. 3)) until 200 R. P. M. is reached. Now the helicopter pitch is realised by turning each blade about its pitch change axis under the influence of fluid pressure in the pitch control unit. For a given throttle opening or applied torque, should the rotor pitch be too great, so as to cause a reduction in speed, the centrifugal governor will allow the plunger valve 132 to move downwards to cut off the pressure fluid supply to the pitch control cylinder and to release the oil pressure in the pitch control cylinder thereby reducing the pitch angle of the blades.

In the event of engine or transmission failure, the governor will open the plunger valve 132 and release the pressure fluid as the rotor is slowing down, thus allowing the blades to return to gyroplane pitch angle under the influence of the spring 164. It is obvious that the pitch control unit may be so arranged that the spring-influenced axial displacement of the piston 152 can be set to allow the blades to return to any desired gyroplane pitch angle or to the no-lift position when landing in a high wind.

In the case where two or more rotors with independent engines are provided, a common governor may be arranged to receive its drive from an element of a coupling interposed between the rotors so as to be responsive to interruption of the drive of either rotor or of any predetermined variation of torque; or, if desired, each engine may have its own independent governor unit with or without means for synchronising the power output from the engines. A master control may be arranged to cut in or out all or any of the engines, automatically or manually as desired.

The pilot-operated control mechanism may also be so arranged as to permit the aircraft to be "jump started" off the ground, as in the case of a "jump start" gyroplane. In a "jump start" gyroplane assuming the normal rotor revolutions in flight to be 200 R. P. M., then, to obtain the necessary kinetic energy for "jump start," the rotor blades are speeded up to 300 R. P. M., while in the zero lift position. The kinetic energy thus stored in the rotor is given out to the air in the form of lift by a rapid increase of the blade pitch angle to gyroplane pitch angle, or to an angle somewhat in excess of that incidence, and the resultant lift causes the machine to rise quickly in the air. At the top of the "jump start," the normal engine airscrew has produced sufficient thrust to cause the machine to travel forwardly through the air and thus to establish autorotation of the rotor. In the case of a helicopter, it is usual to produce steadily the necessary lift to cause the machine to rise slowly off the ground, and whilst so doing, it is subjected to considerable interference from the echo or slip stream of the rotor or rotors when close to the ground. To eliminate this effect, it is possible with the helicopter so to arrange the mechanism that the blades are run above the normal flight speed, thus storing considerable kinetic energy in the rotor or rotors. A rapid change of the rotor pitch to the helicopter pitch which, incidentally, can be carried out at a predetermined rate, will cause the machine to jump from the ground and quickly clear itself from the echo effect. Since the equilibrium speed of the governor is under control of the pilot, it is possible to speed up the rotor beyond normal flight R. P. M. By releasing the governor, the relay will rapidly change the blade pitch angles to the helicopter pitch angle. The rate of change can be controlled by varying the size of the orifice in the pitch change control cylinder.

It has been found in the course of practical tests with helicopters that the ground interference or echo effect, caused by the slip stream of the rotor or rotors, produces considerable instability in the aircraft when the latter becomes just air-borne. In the case of a machine having two rotors disposed one on each side of the fuselage, there is available a certain amount of lateral control which gives the necessary stability about the longitudinal axis. In the case of a machine having a single rotor, or two co-axial rotors arranged one above the other, it is hardly possible to effect lateral correction of the machine without such correction being accompanied by lateral swing of the machine. With the machine say a few inches off the ground when the wind direction suddenly changes, the corrective moment introduced into the machine will cause a lateral swing and, at the same time, the machine may drop until one of the wheels touches the ground, thus producing an overturning moment which cannot be corrected by the control. I, therefore, propose so to arrange the rotor-driving mechanism that the rotors can be run above normal flight speed at zero lift position, so that the kinetic energy thus stored in the rotor system will be given out to the air in the form of lift when the blades are turned to normal helicopter pitch angle. This will cause the machine to rise quickly and thus to move rapidly out of the region in which ground echo effect is experienced, so that any lateral swing may be safely corrected with the wheels some considerable distance from the ground, and no overturning moment will be experienced.

In landing, the machine may be flown to the spot chosen for landing and, when at some predetermined height from the ground, approximately one rotor diameter, the blade pitch angle may be progressively reduced, so that the machine will quickly pass through the echo effect without liability to overturn.

The term "constant speed" as used in the claims means a speed which normally remains substantially constant for a given setting of the centrifugal governor but does not exclude the use of a pilot's control for altering the setting of the governor so that its equilibrium speed may be adjusted to a suitable value.

The term "normal flight" in this application means, in the case of a helicopter, steady flight while the rotor (or rotors) is (or are) being driven by a motor and excludes "jump starting" and landing as a gyroplane (i. e. without the application of power to the rotor). In the case of a gyroplane the term excludes "jump starting" conditions.

What I claim is:

1. In an aircraft having a pair of sustaining rotors disposed on either side of the centre line, an engine, transmission shafts, each including a freewheel clutch, between the common engine shaft and each of the rotors, a centrifugal governor driven from the engine shaft, a pitch change control unit comprising a cylinder, a piston slidable in the cylinder connected to a sleeve having two opposite handed external screw threads each engaged by a rack member which engages a pinion on a shaft, a blade pitch angle control element for each rotor coupled to one of the last mentioned shafts, a valve actuated by the centrifugal governor, controlling the admission of pressure fluid to the control cylinder to move the piston against the action of a spring which, when the pressure is released, tends to move the piston into a position corresponding to gyroplane incidence of the rotor blades, a sprocket mounted on the sleeve to rotate same whereby to cause movement of the rack members in opposite directions to produce differential incidence change of the rotors.

2. In an aircraft, a pair of side-by-side variable pitch sustaining rotors, engine means, a rotor drive system for delivering power from the engine means to the rotors, a pilot's control means for controlling the aircraft in roll including mechanism for inversely varying the mean pitch of the rotors, means for maintaining substantial constancy of rotor R. P. M. including control mechanism connected with the rotor blades to regulate the pitch thereof, and a governor for actuating the control mechanism, the governor being associated with the rotor drive system and providing for simultaneous increase of the mean pitch of the blades of both rotors upon increase in rotor R. P. M. above a predetermined speed and for simultaneous decrease of the mean pitch of the blades of both rotors upon decrease in rotor R. P. M. below said predetermined speed, each of the pitch control mechanisms being adapted to superimpose its effect on that of the other mechanism.

3. A construction in accordance with claim 2, and further incorporating manually controllable means for adjusting the equilibrium speed of the governor means controlling rotor blade pitch angle.

4. A construction in accordance with claim 2, and further incorporating an irreversible actuating connection between the governor and the blade pitch control means.

5. A construction in accordance with claim 2, and further including a manually operable control for effecting simultaneous increase or decrease of the mean pitch of the blades of both rotors.

6. In an aircraft, a pair of sustaining rotors the blades of which are arranged for pitch variation in a range including and extended above a predetermined autorotational pitch setting, engine means, a rotor drive system for delivering power from the engine means to the rotors, the drive to the rotors incorporating overrunning clutch means, and mechanism for maintaining substantial constancy of rotor R. P. M. including control means connected with the rotor blades to regulate the pitch thereof, and a governor for actuating the control means, the governor being coupled to the rotor drive system for actuation thereby at a point between the engine means and the overrunning clutch means and providing for simultaneous increase of the mean pitch of the blades of both rotors upon increase in rotor R. P. M. above a predetermined speed and for simultaneous decrease of the mean pitch of the blades of both rotors upon decrease in rotor R. P. M. below said predetermined speed, whereby said governor is rendered ineffective upon stoppage of the engine means.

7. A construction in accordance with claim 6, in which the governor actuates the pitch control means to maintain an average pitch setting of the rotors higher than the predetermined autorotational setting while the rotors are being driven, and in which the governor actuates the pitch control means to reduce the mean pitch of both rotors to said predetermined autorotational pitch setting, upon stoppage of the engine means.

8. In an aircraft, a variable pitch sustaining rotor the blades of which are arranged for pitch variation in a range including and extended above a predetermined autorotational pitch setting, a prime mover, a drive system for delivering power from the prime mover to the rotor, the drive system including an overrunning clutch providing for autorotative actuation of the rotor upon stoppage of the prime mover, and a governor for regulating the mean rotor blade pitch, the governor being connected with the rotor drive system for actuation thereby at a point between the prime mover and the overrunning clutch and providing for increase of the mean rotor blade pitch to a value above said predetermined autorotational setting when the rotor is being driven and for decrease of the rotor blade pitch substantially to said autorotative setting upon stoppage of the prime mover.

9. A construction in accordance with claim 8, in which the governor operates to increase the mean rotor blade pitch angle when the rotor is driven above a predetermined speed and to decrease the rotor blade pitch angle when the rotor is being driven below said predetermined speed.

10. A construction in accordance with claim 8, in which the governor operates to increase the mean rotor blade pitch angle when the rotor is driven above a predetermined speed and to decrease the rotor blade pitch angle when the rotor is being driven below said predetermined speed, and further incorporating manually operable means for adjusting the equilibrium speed of the governor.

11. In an aircraft having a pair of side-by-side variable pitch sustaining rotors, driving means for the rotors, a pitch control governor actuated by the driving means for simultaneously increasing or decreasing the mean pitch of both rotors, an irreversible actuating connection between the governor and the rotors, and manual control means providing for inverse variation of the mean pitch of the two rotors substantially independently of the simultaneous pitch change as effected by the governor through said irreversible actuating connection.

12. In an aircraft having a pair of sustaining rotors disposed on either side of the centre line of the aircraft, means for acting on the blades to change their effective pitch angles, a governor responsive to the rotational speed of the rotors and operating to control the pitch changing means to maintain the rotor speed substantially constant during normal flight, and means for controlling the aircraft in roll including mechanism for differentially varying the mean pitch of the rotors from the equilibrium value established by said governor.

CYRIL GEORGE PULLIN.